United States Patent
Bales et al.

(10) Patent No.: US 8,315,791 B2
(45) Date of Patent: Nov. 20, 2012

(54) METHOD AND APPARATUS FOR PROVIDING SMART ZOOMING OF A GEOGRAPHIC REPRESENTATION

(75) Inventors: Elizabeth Bales, San Diego, CA (US); Timothy Youngjin Sohn, Mountain View, CA (US)

(73) Assignee: Nokia Coporation, Espoo (FI)

( * ) Notice: Subject to any disclaimer, the term of this patent is extended or adjusted under 35 U.S.C. 154(b) by 232 days.

(21) Appl. No.: 12/818,954

(22) Filed: Jun. 18, 2010

(65) Prior Publication Data

US 2011/0313649 A1    Dec. 22, 2011

(51) Int. Cl.
*G06F 17/10* (2006.01)

(52) U.S. Cl. . 701/301; 701/514; 701/532; 707/999.002; 707/999.003; 707/999.1; 707/999.103; 345/427; 345/423; 345/440; 382/106; 382/113; 382/241; 340/989; 340/990; 340/995.1

(58) Field of Classification Search .......... 701/301, 701/514, 532; 707/999.002, 999.003, 999.1, 707/999.103; 345/427, 423, 440; 382/106, 382/113, 241, 305; 340/989, 990, 995.1
See application file for complete search history.

(56) References Cited

U.S. PATENT DOCUMENTS

| | | | |
|---|---|---|---|
| 6,240,360 B1* | 5/2001 | Phelan | 701/438 |
| 6,526,351 B2* | 2/2003 | Whitham | 701/438 |
| 7,187,997 B2* | 3/2007 | Johnson | 700/245 |
| 7,386,396 B2* | 6/2008 | Johnson | 701/300 |
| 2006/0055693 A1 | 3/2006 | Sylthe et al. | |
| 2006/0197781 A1 | 9/2006 | Arutunian | |
| 2007/0143345 A1 | 6/2007 | Jones et al. | |
| 2007/0150829 A1 | 6/2007 | Eschbach et al. | |
| 2008/0109762 A1* | 5/2008 | Hundal et al. | 715/855 |
| 2008/0231643 A1 | 9/2008 | Fletcher et al. | |
| 2008/0312987 A1 | 12/2008 | Damodaran et al. | |
| 2009/0015672 A1* | 1/2009 | Clapp | 348/143 |
| 2009/0181650 A1 | 7/2009 | Dicke | |
| 2009/0198767 A1 | 8/2009 | Jakobson et al. | |
| 2010/0030462 A1 | 2/2010 | Iwaji et al. | |

(Continued)

FOREIGN PATENT DOCUMENTS

CA    2625651 A1    4/2007

(Continued)

OTHER PUBLICATIONS

International Search Report for related International Patent Application No. PCT/FI2011/050481 dated Nov. 24, 2011, pp. 1-4.

(Continued)

*Primary Examiner* — James Trammell
*Assistant Examiner* — McDieunel Marc
(74) *Attorney, Agent, or Firm* — Ditthavong Mori & Steiner, P.C.

(57) ABSTRACT

An approach is provided for custom zooming of geographic representation. A custom zooming application determines an input specifying a level of zoom for rendering a geographic representation presented at a device, the geographic representation including a plurality of objects. The custom zooming application determines respective degrees of relevance of the plurality of objects based, at least in part, on the device, a user of the device, related context information, or a combination thereof. The custom zooming application determines to render one or more of the plurality of objects with at least one different level of visibility with respect to other ones of the plurality of objects based, at least in part, on the respective degrees of relevance, the level of zoom, or a combination thereof.

20 Claims, 8 Drawing Sheets

U.S. PATENT DOCUMENTS

| | | | |
|---|---|---|---|
| 2010/0146436 A1 | 6/2010 | Jakobson et al. | |
| 2010/0223577 A1 | 9/2010 | Bennett et al. | |
| 2010/0295971 A1 | 11/2010 | Zhu | |
| 2011/0141115 A1* | 6/2011 | Brandes et al. | 345/428 |
| 2011/0208724 A1 | 8/2011 | Jones et al. | |
| 2011/0264529 A1* | 10/2011 | Conlan et al. | 705/14.63 |

FOREIGN PATENT DOCUMENTS

| | | |
|---|---|---|
| CN | 101317175 A | 12/2008 |
| EP | 1 638 015 A1 | 3/2006 |
| EP | 2 078 929 A1 | 7/2009 |
| EP | 2 079 052 A1 | 7/2009 |
| EP | 1955211 B1 | 12/2011 |
| JP | 2002-286470 A | 10/2002 |
| JP | 2007-264474 A | 10/2007 |
| JP | 2009-511991 A | 3/2009 |
| KR | 20080068845 A | 7/2008 |
| KR | 10-2009-0029596 A | 3/2009 |
| WO | WO 2006/027773 A2 | 3/2006 |
| WO | WO 2007/044975 A2 | 4/2007 |

OTHER PUBLICATIONS

International Written Opinion for related International Patent Application No. PCT/FI2011/050481 dated Nov. 24, 2011, pp. 1-8.

* cited by examiner

700

METHOD AND APPARATUS FOR PROVIDING SMART ZOOMING OF A GEOGRAPHIC REPRESENTATION

BACKGROUND

Service providers (e.g., wireless and cellular services) and device manufacturers are continually challenged to deliver value and convenience to consumers by, for example, providing compelling network services and advancing the underlying technologies. One area of interest has been the development of services and technologies for providing contextual and/or personalized rendering of maps. More specifically, electronic mapping services are capable of providing vast stores of detailed information relating to features of a map or geographic representation (e.g., points of interest, roads, terrain, geographical features, thematic markers, corresponding text labels, etc.). However, the amount of mapping detail available from modern mapping services can quickly overwhelm the display capability of a device as well as a user's ability to comprehend the information even when a user zooms into the map or representation for a more detailed view. Accordingly, service providers and device manufacturers are challenged to develop new mechanisms for organizing and presenting mapping information to display, highlight, or otherwise indicate contextually appropriate information of most relevance or importance to a particular user.

SOME EXAMPLE EMBODIMENTS

Therefore, there is a need for an approach for providing smart or custom zooming of a map or geographic representation.

According to one embodiment, a method comprises determining an input specifying a level of zoom for rendering a geographic representation presented at a device, the geographic representation including a plurality of objects. The method also comprises determining respective degrees of relevance of the plurality of objects based, at least in part, on the device, a user of the device, related context information, or a combination thereof. The method further comprises determining to render one or more of the plurality of objects with at least one different level of visibility with respect to other ones of the plurality of objects based, at least in part, on the respective degrees of relevance, the level of zoom, or a combination thereof.

According to another embodiment, an apparatus comprising at least one processor, and at least one memory including computer program code, the at least one memory and the computer program code configured to, with the at least one processor, cause, at least in part, the apparatus to determine an input specifying a level of zoom for rendering a geographic representation presented at a device, the geographic representation including a plurality of objects. The apparatus is also caused to determine respective degrees of relevance of the plurality of objects based, at least in part, on the device, a user of the device, related context information, or a combination thereof. The apparatus is further caused to determine to render one or more of the plurality of objects with at least one different level of visibility with respect to other ones of the plurality of objects based, at least in part, on the respective degrees of relevance, the level of zoom, or a combination thereof.

According to another embodiment, a computer-readable storage medium carrying one or more sequences of one or more instructions which, when executed by one or more processors, cause, at least in part, an apparatus to determine an input specifying a level of zoom for rendering a geographic representation presented at a device, the geographic representation including a plurality of objects. The apparatus is also caused to determine respective degrees of relevance of the plurality of objects based, at least in part, on the device, a user of the device, related context information, or a combination thereof. The apparatus is further caused to determine to render one or more of the plurality of objects with at least one different level of visibility with respect to other ones of the plurality of objects based, at least in part, on the respective degrees of relevance, the level of zoom, or a combination thereof.

According to another embodiment, an apparatus comprises means for determining an input specifying a level of zoom for rendering a geographic representation presented at a device, the geographic representation including a plurality of objects. The apparatus also comprises means for determining respective degrees of relevance of the plurality of objects based, at least in part, on the device, a user of the device, related context information, or a combination thereof. The apparatus further comprises means for determining to render one or more of the plurality of objects with at least one different level of visibility with respect to other ones of the plurality of objects based, at least in part, on the respective degrees of relevance, the level of zoom, or a combination thereof.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for custom zooming of geographic representation are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although various embodiments are described with respect to a navigation map, it is contemplated that the approach described herein may be used with other geographic representations. Examples of other geographic representations include aerial photography, cartogram, physical geography (e.g., oceanography), contour lines (e.g., weather, elevation, depth, Earth's magnetic field, environmental science, social science, etc.), fantasy maps, geoinformatics, geomatics, geovisualization (e.g., forestry, archaeology, urban planning, etc.), locator maps, map projection, orthophoto, photogrammetry, pictorial maps (e.g., illustrated maps, panoramic maps, perspective maps, bird's-eye view maps), planetary cartography, remote sensing maps (e.g., by way of aircraft, spacecraft, satellite, buoy, ship, etc.), thematic maps, terra incognita, web mapping, etc.

Figure 1:
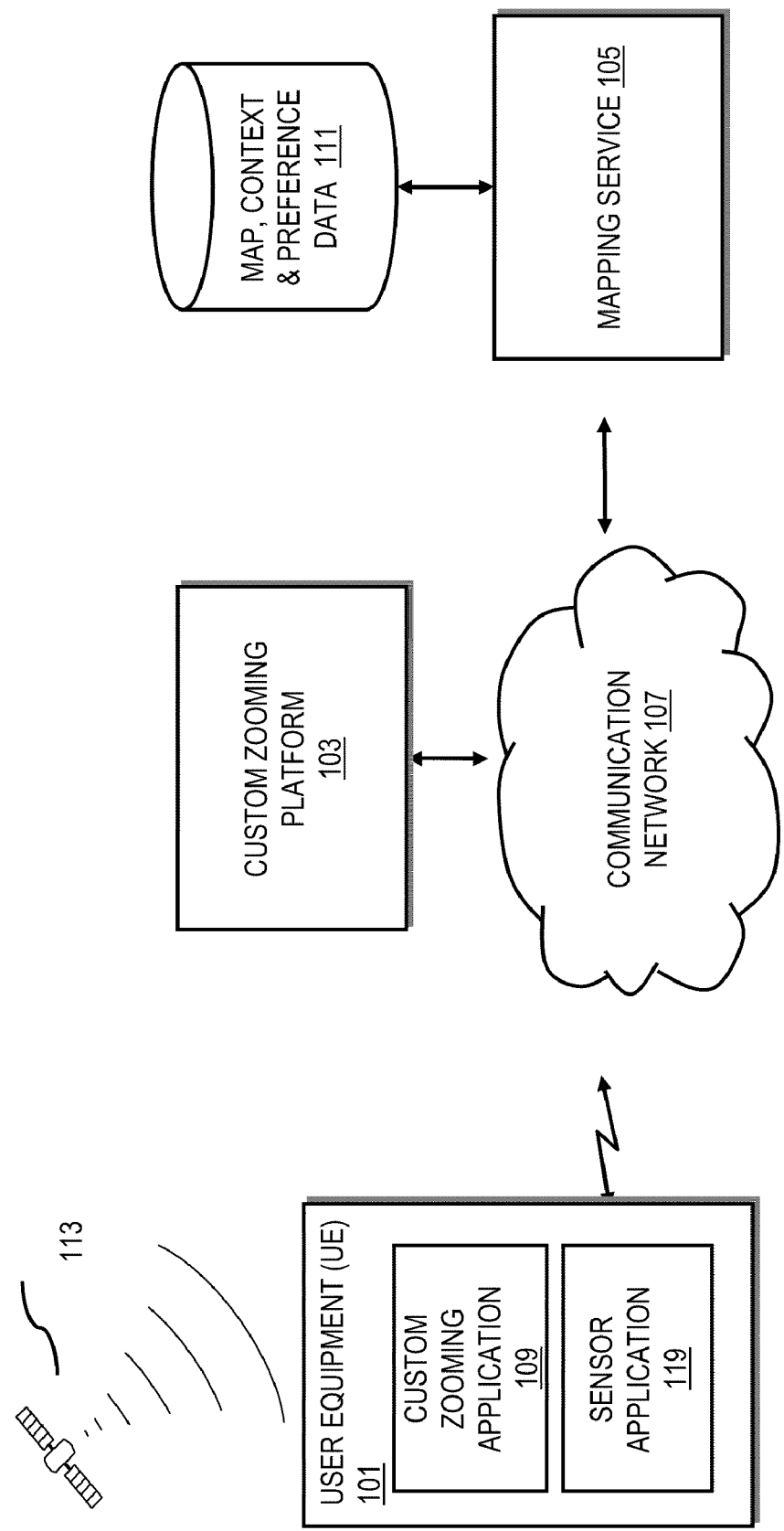
FIG. 1 is a diagram of a system capable of custom zooming of geographic representation, according to one embodiment.

FIG. 1 is a diagram of a system capable of custom zooming of geographic representation, according to one embodiment. Rich and interactive maps are one of the major applications for user terminals, especially mobile devices (e.g., smart phones). By way of example, many modern mobile devices incorporate map applications that support features such as zooming and displaying points of interest and related navigation directions. Map applications generally enable users to quickly get an overview of nearby places and directions to these places. Such map applications historically are implemented using, for instance, tile-based rendering systems to increase map rendering speeds and provide more responsive feedback to users.

However, tile-based rendering can cause potential problems when users attempt to zoom into a map. More specifically, by zooming, a user attempts to magnify specific areas of a map or geographic representation to visualize map objects in more detail. In a typical tile-based rendering system, as new map tiles are created and rendered at the new zoom level, the new map objects or text that are displayed in the zoomed map are often rendered in relatively the same size font as the previous zoom level. In other words, when the user zooms in on the map or geographic representation, the detail level of the map increases, but the font size of text labels associated with the map objects remains unchanged. Even in map applications that use non-tile-based rendering systems (e.g., a raster or vector engine), zooming in or out of a map is often performed using a process based on uniform scaling wherein the individual bitmaps or map primitives representing map objects (e.g., roads, text labels, water bodies, parks, points of interest, etc.) are uniformly resized. This, in turn, makes it more difficult for users to quickly glance and determine relevant information from the map even when attempting to zoom in a particular section of the map for more detail.

To address this problem, the system 100 of FIG. 1 introduces the capability to provide smart or custom zooming of a map or geographic representation by differentially rendering map objects or text based, at least in part, on context and/or relevance. In one embodiment, on initiating a zoom or otherwise specifying a zoom level, the differential rendering of system 100 modifies the visibility of contextually relevant map objects with respect to other map objects. By way of example, the system 100 can modify visibility by enlarging the text size for labels associated with map objects, changing the color of the map objects, increasing line weights of the map objects, and the like. In one embodiment, the context information includes what travel routes have been specified, how the user plans to use the map, what features of the map are relevant to the user and to the purpose of the map, what information is to be presented on the map, and the like. In this way, the system 100 advantageously renders more prominently those items of most relevance or importance to a user for the user to quickly view at a glance.

By way of example, the system 100 provides a user interface for the user to adjust (e.g., specifying a zoom level) the graphical representations of certain objects (e.g., each road name on a user-specified route) according the context (e.g., a route to the airport) by varying the visibility of selected map objects. As noted above, the visibility of the relevant objects can be adjusted by changing to them into a different size, color, shape, filament type, 3D, animation, multimedia, or a combination thereof, from other objects on the map. Beside text labels, the manipulated labels may be symbols, signs, markers, tabs, avatars, or a combination thereof. In one embodiment, the user interface enables the user to customize the rendering of the individual map objects (e.g., roads, water, text labels, etc.) during zooming. In addition, the system 100 determines respective degrees of relevance of the objects based the user, the user device, and/or related context information, to render the objects with different levels of visibility on the map. The context information includes at least user navigation data, user preferences, or a combination thereof. This smart or custom zooming approach enables zooming into or out of a map to display those objects selected by a user within a particular user context. The system 100 thus enhances the degrees of freedom in terms of how maps can be zoomed in/out within the context associated with the users.

In another embodiment, the system 100 also prioritizes the objects based on different criteria, and renders them with the different level of visibility based on the prioritization. By way of example, a user can view rental property with different symbol sizes based on one characteristic (e.g., studio, one bedroom, two bedrooms, etc.), and with different colors based another characteristic (e.g., monthly rents from low/light color to high/dark color). The visibility of the rental property symbols can be further adjusted based upon amenities, etc. when zooming into a map.

In one embodiment, the system 100 can implement differential visibility using a raster, vector, or tile rendering engine by, for instance, overlaying more visible object images on top on the map for the next zoom level. For example, the system 100 overlays a bigger image of the road name on the spot. In another embodiment, the system 100 removes a part or the whole image of the road name from one spot in a tile, and then overlays a bigger image of the road name on the spot. The bigger image of the road name can be generated locally at the user device or remotely by a mapping service platform. The locally generated bigger image can be quickly rendered on the mobile map display, and does not require network bandwidth resources.

As shown in FIG. 1, the system 100 comprises a user equipment (UE) 101 having connectivity to a custom zooming platform 103 and a mapping service 105 via a communication network 107. In one embodiment, the custom zooming platform 103 facilitates custom zooming of geographic representations by either the mapping service 105 or a custom zooming application 109 executed by the UE 101. For example, the custom zooming platform 103 heuristically manipulates individual map objects retrieved from a map, context and preference database 111 via the mapping service 105. The manipulation performed by the custom zooming platform 103 includes, for instance, providing differential zooming and levels of detail for map objects based on the level or relevance of the objects to the UE 101, a user of the UE 101, and/or related context information. Based on the computed degree of relevance, the custom zooming platform 103 can custom zoom the most important map objects and/or reduce the visibility of the less important map objects. The custom zooming platform 103 then interacts with the mapping service 105 and/or the custom zooming application 109 to initiate rendering of the map at the next or specified zoom level. In certain embodiments, the custom zooming platform 103 can directly render the custom zoom map without interaction with either the mapping service 105 or the custom zooming application 109.

In another embodiment, the mapping service 105 is a managed service provided by a service provider or operator of the network 107 (e.g., a web service provider, a communications servicer provider, etc). By way of example, the mapping service 105 collects, assembles, stores, updates, and supplies map data and map formats to users and/or subscribers to the service 105. The custom zooming platform 103 also includes or have access to the user context and related preference information to determine the degree of relevance for the objects and then to present the relevant objects at the UE 101 for the user to manipulate their visibility in the map.

The mapping, context and preference data is stored in, for instance, the database 111. As shown, the database 111 has connectivity to the mapping service 105. However, it is contemplated that the database 111 may have direct connection to the network 107, the custom zooming platform 103, and/or the custom zooming application 109. There may also be multiple databases (not shown) containing map data within the system 100. The multiple databases may operate independently or in synchronization to provide map data to users of the network 107. As discussed previously, the map data database 111 stores map data including map objects or primitives and their associated metadata.

The custom zooming application 109 may operate as a client of the custom zooming platform 103 and/or the mapping service 105 to provide mapping information to the UE 101. In addition or alternatively, the custom zooming application 109 may operate independently to provide all or a portion of the functions of the mapping service 105 and/or the custom zooming platform 103. In one embodiment, the custom zooming platform 103 and/or the mapping service 105 can be implemented via shared, partially shared, or different computer hardware.

In one embodiment, the UE 101 also exchanges user context and preference information with external databases using a custom zooming platform 103 via the communication network 107. For the sake of simplicity, FIG. 1 depicts only a single UE 101 in the system 100. However, it is contemplated that the system 100 may support any number of user terminals up to the maximum capacity of the communication network 107. For example, the network capacity may be determined based on available bandwidth, available connection points, and/or the like.

By way of example, the custom zooming platform 103 retrieves from the database 111 navigation data (e.g., maps, POIs, etc.), user context and preference data (e.g., trips, routes, favorite places, etc.), etc. The user can, for instance, input an address to request directions. The custom zooming platform 103 searches the navigation data for a route to the address, searches objects (e.g., POIs including gas stations, restaurants, etc.) along/near the route, and then offers to the user the objects for manipulating their visibility on the map for the next zoom level. Optionally, the custom zooming platform 103 filters the objects based upon user context and preferences. The custom zooming platform 103 then interacts with the user to select applicable visibility features (e.g., size, color, shape, filament type, 3D, animation, multimedia, etc.) for rendering of the map.

By way of example, the UE 101, the custom zooming platform 103, and the mapping service 105 communicate with each other and other components of the communication network 107 using well known, new or still developing protocols. In this context, a protocol includes a set of rules defining how the network nodes within the communication network 107 interact with each other based on information sent over the communication links The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

By way of example, the communication network 107 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, Personal Digital Assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

It is noted that the UE 101 may track a user's position via satellites 113, such as the United States' Global Positioning System (GPS) satellites, Russia's Global Navigation Satellite System (GLONASS) satellites, the Chinese Compass navigation system, the Galileo positioning system of the European Union (EU), pseudolites, etc. In one embodiment, the UE 101 uses artificial intelligence software to communicate that information over broad distances from the user's location to the satellite, and then back to the UE 101. The position data is incorporated in the context information for determining respective degrees of relevance of the objects and rendering them with different levels of visibility at the next zoom level.

The UE 101 also includes a sensor application 119 for detecting or sensing one or more contextual characteristics (e.g., time, location, current activity, etc.) associated with the UE 101. This contextual information can then be transmitted to the custom zooming platform 103 to construct/enhance the user context data for use in generating personalized map presentations. By way of example, the sensor application 119 may include one or more global positioning system (GPS) receivers for determining a location, an accelerometer to determine a movement or tilt angle, a magnetometer to determine a directional heading, a microphone to determine ambient noise, a light sensor, a camera, and/or the like. In addition or alternatively, the UE 101 may obtain contextual information from one or more of the web services (e.g., a weather service, a location tracking service, social network service, etc.), so as to determine respective degrees of relevance of the objects and rendering them with different levels of visibility at the next zoom level.

The database 111 includes general navigation data, as well as historical and contextual navigation data of a user at different time points. In one embodiment, the historical and contextual navigation data is automatically recorded at the UE 101 with respect to user personal data, navigation, and related activities, points of interests, etc. The historical and contextual navigation data is stored and/or cached locally at the UE 101. In another embodiment, the data is stored at the web service platform 103 and/or other external databases.

By way of example, the elements of the historical and contextual navigation data include location (where the user/UE was, etc), visiting dates and time, sub-identifiers (each sub-identifier associated with a different location and/or applicable POI category), event type (event information associated with the user/UE), time (of the event if the user/UE involves), applicable activity (in which the activity is applicable to the POI category and/or POI), context source (what sensors, services, applications, etc. Can provide the related contextual information), etc. The user navigation data is incorporated in the context information for determining respective degrees of relevance of the objects and rendering them with different levels of visibility at the next zoom level.

The database 111 further includes context information and user preference information. The context information includes discrete context characteristics/data of a user and/or the user terminal/equipment (UE), such as a date, time, location, current activity, weather, a history of activities, etc. Associated with the user. In an effort to organize the user context data includes instances, locations (e.g., points of interest), and events (e.g., activities) that contain possible relationships between points of interest and user activities discovered via, for instance, data-mining or other querying processes.

By way of example, the contextual information incorporates characteristics and features of an individual user's context data, such as the user's calendar, text messages, instant messages, etc. The user preference information includes user information and user preference data. Typical user information elements include a user identifier (e.g., telephone number), user device model (e.g., to identify device capabilities), age, nationality, language preferences, interest areas, login credentials (to access the listed information resources of external links) In one embodiment, the preference data is automatically retrieved and/or generated by the system from the backend data and/or external information sources. In another embodiment, the preference data structure is recorded at the user device based upon user personal data, online interactions and related activities with respect to specific topics, points of interests, or locations, etc. It is contemplated that the user can define any number of preference elements and tokens as user preference data. In addition or alternatively, the system decides what parameters or attributes to choose to represent user context and/or preferences. The user context and preference data is incorporated in the context information for determining respective degrees of relevance of the objects and rendering them with different levels of visibility at the next zoom level.

Figure 2:
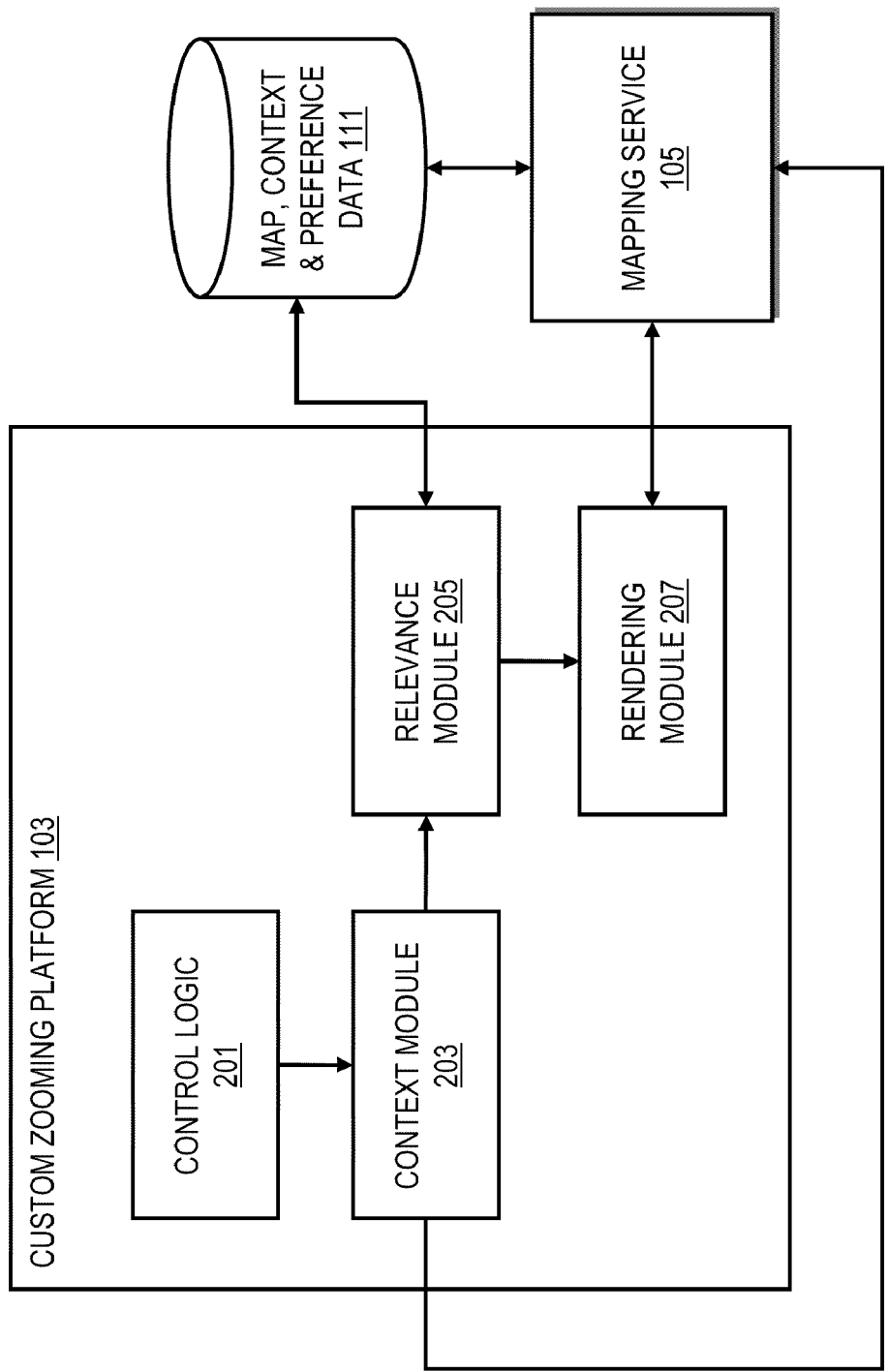
FIG. 2 is a diagram of the components of a custom zooming platform, according to one embodiment.

FIG. 2 is a diagram 200 of the components of a custom zooming platform, according to one embodiment, according to one embodiment. By way of example, the custom zooming platform 103 includes one or more components for custom zooming geographic representation. It is contemplated that the functions of these components may be combined in one or more components or performed by other components of equivalent functionality. In this embodiment, the custom zooming platform 103 includes at least a control logic 201 which executes at least one algorithm for executing functions of the custom zooming platform 103. For example, the control logic 201 interacts with the context module 203 to determine the related context information for rendering a smart or custom zoom map. In one embodiment, the context module 203 communicates with the mapping service 105, the custom zooming application 109 of the UE 101, or other component of the network 107 to retrieve map, context, and preference data from the database 111, and determines the related context information with predetermined algorithms. The related context information may describe, for instance, an intended purpose of the map (e.g., tourist map, navigation map, hiking map, etc.), an environment for use of the map (e.g., walking, in a car, etc.), user interests (e.g., favorite POIs), and the like.

The control logic 201 interacts with a relevance module 205 to determine degrees of relevance of map objects for rendering a map. The relevance module 205 may use a variety of factors to determine respective degrees of relevance of the objects based, such as the UE 101, the user of the device, and/or the related context information determined by the context module 203.

In one embodiment, the relevance module 205 receives direct user input specifying particular user context. For example, a user may directly specify that the user would like to display a tourist map of a particular city. In another embodiment, the relevance module 205 detects the purpose for invoking the custom zooming platform 103 in the request for custom zooming. For example, if a navigation service has requested directions to a destination, the relevance module 205 may infer that the context of the map is for turn-by-turn navigation. Accordingly, the context would place a higher degree of relevance on routing and traffic information and/or map objects (e.g., roads, points of interest) along a calculated route to the destination.

In another embodiment, the module 205 retrieves the metadata associated with each object from the database 111. The metadata includes information such as the object's name, category (e.g., road, point of interest, water body, park, etc.), location, etc. The module 205 then performs a semantic analysis on the metadata to determine a degree of relevance of the metadata with the related context information. For example, if the context is a hiking trip, the module 205 may classify map objects with metadata that indicate an association with national parks in a category of higher relevance that objects associated with shopping malls.

In yet another embodiment, the relevance module 205 may infer the context from the location of the user. For example, if a user requests custom zooming while located in a shopping center, the relevance module 205 may infer that the context of the map is related to shopping and will place a higher degree of relevance on shopping points-of-interest or other map objects related to shopping. As mentioned, other indirect methods for determining the relevant context include, evaluating a recent history of online searches or recently view websites, evaluating recent communications (e.g., voice, text messages, and e-mails) for key words related to particular contexts, or monitoring historical travel patterns or activities.

The relevance module 205 may then interact with a relevance module 205 to prioritize the objects based on one or more criteria to adjust the different levels of visibility and render accordingly. Prioritization includes determining the specific order for rendering some objects in a group/category more visible than the others. In other words, rather than displaying the labels of nature with the same visibility in the map as conventionally done, the prioritization by the module 205 determines which objects to render more visibly based on the same or similar degree of relevance.

The relevance module 205 also uses, for instance, semantic information and/or metadata of the context to determine the priority of objects. The metadata includes information such as the object's name, category (e.g., road, point of interest, water body, park, etc.), location, etc. In one embodiment, the objects are directly retrieved from the map metadata and analyzed. In another embodiment, only objects that meet a predetermined degree of relevance are retrieved for prioritization.

By way of example, the module 205 retrieves the user preference associated with the relevant objects (i.e., objects meeting a relevance threshold) from the context and preference database 207. The module 205 then performs a semantic analysis on the metadata to determine a priority of the relevant objects with respect to the related context information. For example, if the context is a hiking trip, the module 205 may prioritize map objects of hiking trails higher than biking trails in parks.

It is noted that relevance determination reduces the processing time associated with prioritization by eliminating objects of low or no relevancy to the context. This approach is particularly advantageous when rendering maps on a mobile device with limited computational resources.

The control logic 201 interacts with a rendering module 207 to render a custom zoom map. The rendering module 207 presents visibility elements, such as size, color, shape, filament type, 3D, animation, multimedia, etc., for the user to select with respect to rendering the relevant/prioritized objects. The map objects may POIs, roads, etc, and their representation elements may contain text, symbols, signs, markers, tabs, avatars, etc. The rendering module 207 receive one or more user selections to apply determined levels of visibility elements on selected representation elements for the relevant/prioritized objects on the UE 101. The visibility can be defined by an absolute value and/or in relative manner. By way of example, the hotel name images are defined as a font size 14 or as twice bigger as gas station symbols. Thereafter, the module 207 displays the objects accordingly for the next zoom level.

The rendering module 207 receives user selection of one or more map objects, via an input component of the UE 101 such as a keyboard, a touch screen, etc. By way of example, the rendering module 207 detects touching on a screen of the UE 101 by a stylus, a finger, etc., and determines a presence and a location of a touch within the screen of the UE 101. The screen can be set to have a part or the whole screen sensitive to touching. By way of example, the user and/or the rendering module 207 sets only the objects within one or more zip code areas of interest in the screen to be sensitive to touches so as to avoid unintentional activation of objects outside of the zip code areas of interest.

There are different ways to select the image objects. In one embodiment, the user selects each object individually. By way of example, the user selects one gas station after another one to apply with one or more different degrees of visibility at the next zoom level. In another embodiment, the map objects are grouped by categories to be selected together. By way of example, when the use taps on one gas station, all gas stations shown in the screen are selected to be applied with a different degree of visibility at the next zoom level.

There are different ways to vary a degree of visibility of a selected object. In one embodiment, the rendering module 207 increases the degree of visibility of a selected object when receiving further taps on the same object or a continuous touch on the same object. By way of example, if the user keeps a finger on an object for a first predetermined time period (e.g., two seconds), the degree of visibility increase by one level. If the user continues touching the same object for over a second predetermined time period (e.g., another two second), the degree of visibility of the object increases by another level.

The user and/or the rendering module 207 can set one or more limitations on the degrees of visibility per object, per object category, etc. When a limitation is reached, the rendering module 207 may display a warning to the user or start decreasing the visibility of the relevant object at the next zoom level. The decrease of visibility may proceed incrementally per level or directly jumping back to an original or default level. The user and/or the rendering module 207 can set one or more limitations on how many objects can be selected by the user at once. By way of example, if that maximum number of objects can be selected at once is set as three, the user can select three objects at once by tapping one object of a group of three or by tapping three objects individually and substantially simultaneously. Each selection will trigger increasing one degree of visibility of the selected object at the next zoom level. The limitations of object numbers selected at once and of degrees of visibility can be set in consideration of the device capabilities (e.g., hardware, software, service subscription, etc.) of the UE 101, optimal and/or acceptable user viewing preferences, etc.

In one embodiment, the rendering module 207 interacts with the external mapping service and/or the internal custom zooming platform 103 to render custom zooming based on the levels of visibility determined by the rendering module 207 for the relevant/prioritized objects. In another embodiment, the rendering module 207 adjusts in what detail the objects can be actually displayed on the UE 101 to deliver the determined level of visibility based upon the display capabilities (e.g., hardware, software, etc.) of the UE 101. Based on the levels of desired visibility, the rendering module 207 differentially renders of the map objects accordingly at the next zoom level.

In certain embodiments, the rendering module 207 uses a raster engine to custom zoom geographic representation. A raster graphics image or bitmap is a data structure representing a generally rectangular grid of pixels, or points of color. A bitmap is technically characterized by the width and height of the image in pixels and by the number of bits per pixel (a color depth, which determines the number of colors it can represent).

In certain embodiments, the rendering module 207 uses a vector rendering engine to generate the personalized map image from the vector primitives corresponding to the map objects to be displayed. A vector graphics image is defined by geometric primitives as opposed to bitmaps. The use of geometrical primitives, such as points, lines, curves, and shapes or polygon(s), is based on mathematical equations to represent the electronic image. Vector graphics files store the lines, shapes and colors that make up an image as mathematical formulae. These formulae can produce an image scalable to any size and detail, as allowed by a screen resolution. These vector primitives, for instance, are models that use, e.g., a data structure or vector-based language, to describe the appearance of map objects in a resolution independent manner. The vector rendering engine then converts these models to a digital or raster graphics image that is displayable by the UE 101.

In addition or alternatively, the rendering module 207 may use tile-based map rendering. In contrast to a vector rendering engine, a map tile renderer does not directly interpret vector primitives to generate a personalized map. Instead, the map tile renderer creates a map image by compositing tiles (e.g., pre-rendered images representing specific sections of the map). To support map tile renderers, the rendering module 207 may pre-generate tiles of differing amounts of detail that can be iteratively displayed using a map tile renderer. In another embodiment, the rendering module 207 removes existing map objects from the tile, and overlays a more visible version of the map object thereon.

In one embodiment, the platform 103 may be implemented via one or more existing service platforms (e.g., a web service platform, a communication platform, etc.). In another embodiment, the platform 103 is a brand new platform that co-exists with the existing platforms for providing custom zooming of geographic representation.

The functions of the custom zooming platform 103 can be implemented via the custom zooming application 109 in the UE 101 according to another embodiment. In this embodiment, the custom zooming application 109 includes modules similar to those of the custom zooming platform 103, as previously described. In one embodiment, the custom zooming application 109 may be an access control application (e.g., a widget). Widgets are light-weight applications, and provide a convenient means for presenting information and accessing services. It is contemplated that the functions of these components may be combined in one or more components or performed by other components of equivalent functionality.

When active, the custom zooming platform 103 and/or the UE 101 may monitor predetermined triggering events to aggregate as part of context information. The triggering events include a traffic jam, car accident, road work, severe weather (e.g., heavy rain/snow, etc), home/office alarm, emergency notice, etc. In one embodiment, the UE 101 subscribes to a web service platform for information on traffic jams, car accidents, road work, severe weather, etc., and determines whether such triggering events occur on the navigation route. If so, the UE 101 automatically incorporates the triggering event on the route in conjunction with other context information to adjust the respective degrees of relevance of the objects. By way of example, the UE 101 automatically considers a traffic jam in conjunction with an almost empty gas tank, and automatically changes or offers to the visibility of map objects associated with gas stations when applying a different zoom level.

In another embodiment, the UE 101 detects triggering events via sensors built in the UE 101 or otherwise accessible by the UE 101. For example, when the UE 101 arrives at a park, the on-board navigation device detects high humidity, and suggests to the user to change the visibility of convenience stores carrying rain gear when applying a different zoom level.

It is noted that a considerable amount of relevant user activities actually happen when user is offline (e.g., not connected into Internet). Therefore, the custom zooming platform 103 uses the capabilities of the UE 101 to record and track the offline activities, such as the user's visits to the point of interest (e.g., a community center, office, supermarket, restaurant, park, museum, etc.). The custom zooming platform 103 may track user's offline activities including (1) GPS data indicating the user's actual visits to a POI (e.g., a particular restaurant), (2) bills/receipts charged for the user's actual visits to the restaurant, etc., (3) mentioning the restaurant by the user in the user's calendar appointments, (4) calling by the user inside the restaurant, (5) voting by the user the restaurant as excellent (e.g. In a survey), (6) media items (articles, music, video, photos, etc. posted in blogs on web pages, etc.) created by the user regarding the restaurant, etc. The custom zooming platform 103 may look for the name of the restaurant mentioned in text or audio messages created by the user. In this case, the custom zooming platform 103 determines which restaurant is represented in articles, music, video, photos by looking via a GPS position and heading data in the data files. The custom zooming platform 103 may conduct content analysis of the communications (e.g., text or audio messages, graphics, content items, media files, etc.) of the user to look for expressions of personal importance towards the restaurant, such as "I really love the Italian Restaurant, I eat there as often as I can", "I take every opportunity to invite people to dine at the Italian Restaurant," etc. The custom zooming platform 103 may explore associations between the user and the restaurant by accessing databases storing data on where the user lives in, works in, has a membership to (e.g., a dining club), as well as databases storing data on where (the restaurants) the user's friends or contacts live in, work in, have a membership to, etc. The custom zooming platform 103 may collect raw user activity and group behavior information with respect to POIs to suggest to the user to change these objects' visibility in the map at a different zoom level.

Figure 3:
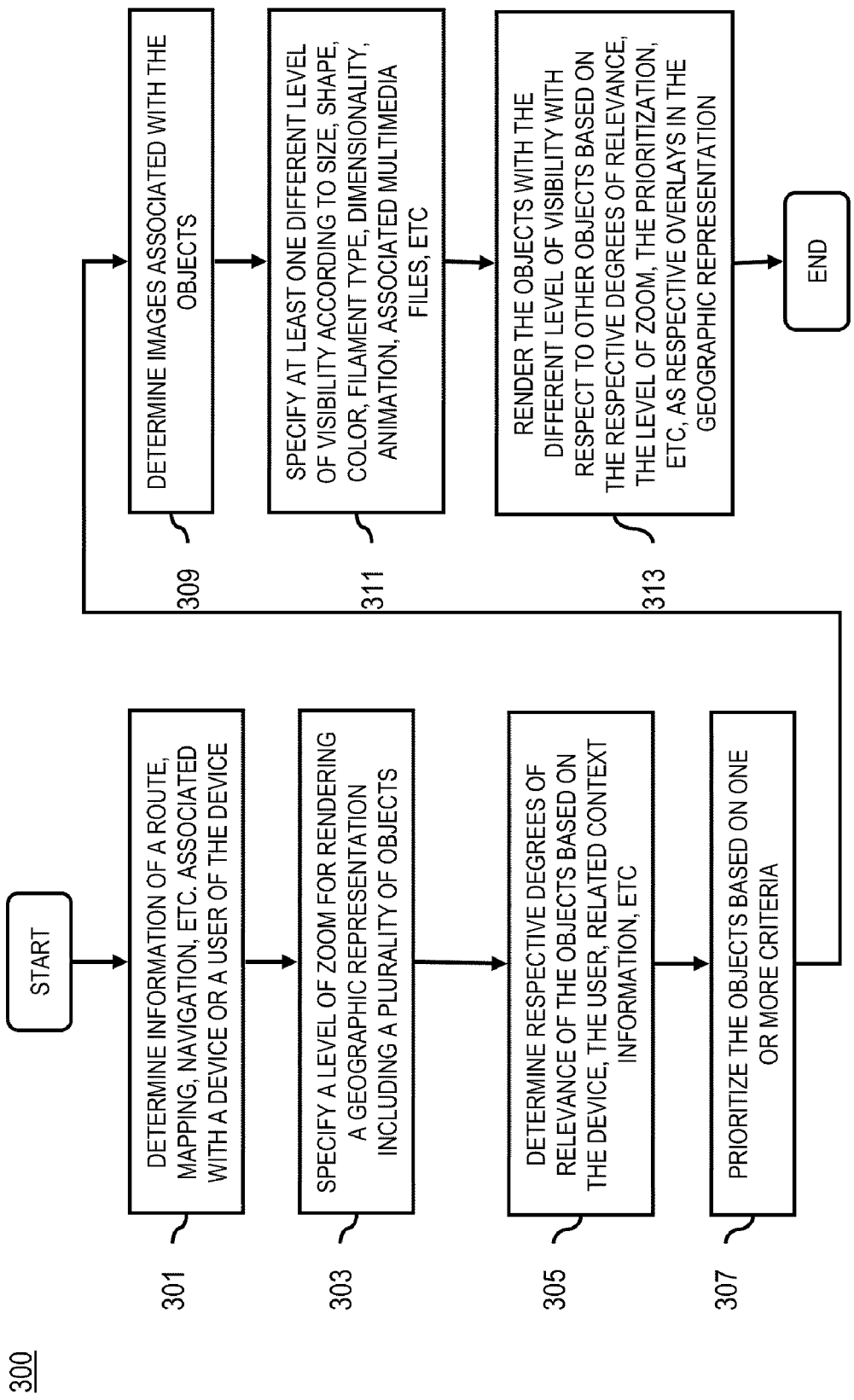
FIG. 3 is a flowchart of a process for facilitating custom zooming of geographic representation, according to one embodiment.

FIG. 3 is a flowchart of a process for facilitating custom zooming of geographic representation, according to one embodiment. In one embodiment, the custom zooming platform 103 performs the process 300 and is implemented in, for instance, a chip set including a processor and a memory as shown FIG. 7. In addition or alternatively, the custom zooming application 109 may perform all or a portion of the process 300. In step 301, the custom zooming platform 103 determines route information, mapping information, navigation information, or a combination thereof associated with a device (e.g., the UE 101) or a user of the device. By way of example, the route information includes a route for relocating to a new city, and the mapping information includes the current location, the destination, the connecting roads, points of interest (e.g., gas stations, restaurants, hospitals, parks, police stations, etc.) on the route, etc., and the navigation information includes the directions, distances, traffic, etc.

The custom zooming platform 103 analyzes the contextual characteristics (e.g., time, location, current activity, historical activity, etc.) referenced in a particular user context (e.g., a navigation route) using, for instance, data mining techniques (e.g., word parsing followed by a probabilistic analysis of the parsed words to categorize the route and corresponding activities) to determine respective degrees of relevance of map objects in the corresponding map or geographic representation. The degrees of relevance can then be used to determine the different levels of visibility of the respective map objects when differentially rendering the map on selection of a different zoom level. The same data mining techniques are used to determine and analyze information associated with user preference characteristics (e.g., food, clothing, housing, vehicles, learning, entertainments, etc.) to enhance the determination of respective degrees of relevance of the objects.

In one embodiment, the custom zooming platform 103 determines an input (e.g., via the UE 101) specifying a level of zoom for rendering a geographic representation (e.g., a navigation map to the new city) presented at the device (Step 303). The geographic representation usually includes a plurality of objects which represent the route, the roads, landmarks, points of interest, and/or other map features. By way of example, the plurality of objects may represented in the geographic representation as text, symbols, signs, markers, tabs, avatars, or a combination thereof.

Next, the custom zooming platform 103 determines respective degrees of relevance of the plurality of objects based, at least in part, on the device, the user of the device, related context information, or a combination thereof (Step 305). In one embodiment, the platform 103 determines the respective degrees of relevance of the plurality of objects per category based one or more sets of information on the device, the user, and the context. By way of example, the object categories may include road name, points of interest (POIs) near/on the route, POIs near/on the route visited by the user, POIs near/on the route that the user wants to visit, etc.

By way of example, the platform 103 uses information of the device capabilities and/or available applications to decide what kind of mapping functions and how much data the device can process. The platform 103 determines objects that cannot be process by the device or are otherwise incompatible have no relevance to the geographic representation. By way of example, the display capabilities include the physical size of the display area, the resolution of the display of area, and the style of the map selected for display. Based on these parameters, the custom zooming platform 103 determines a detail capacity associated with a total amount of detail of the plurality of objects to be rendered in the map according to the degrees of relevance of the objects.

The user information includes the user's context, preferences, prior behavior, etc. The related context information includes the route information, the mapping information, the navigation information, metadata of the geographic representation, metadata of the plurality of objects, semantic information of the geographic representation, semantic information of the plurality of objects, or a combination thereof. As another example, the platform 103 determines restaurants are more relevant than hospitals in the context that the almost dinner time.

In one embodiment, the custom zooming platform 103 renders the categories and/or objects on the user interface for the user to select for custom zooming. In another embodiment, the custom zooming platform 103 also determines to prioritize the plurality of relevant objects based, at least in part, on one or more criteria (Step 307).

The custom zooming platform 103 may prioritize the categories and/or objects within each category, and then renders a list of categories and/or a list of objects per category on the user interface based upon one or more respective priority orders. The prioritization is implemented on the objects that are already determined as relevant, and/or meet a predetermined degree of relevance. The prioritization can be implemented directly on all relevant objects and/or within each category, depending upon the characteristics of the categories and the characteristics of the criteria. In many cases, the prioritization of the objects is in line with the degrees of relevance.

In one embodiment, the criteria are set by the user. By way of example, when zooming into a five mile radius from the current location to take a coffee break, the user sets the criteria to prioritize coffee shops, convenience stores, supermarkets, etc. by user preferences, by distance, by price, or a combination thereof. The user prefers coffee shops over convenience stores because the user would like to sit inside the shop and drink the coffee there, and the user prefers convenience stores over supermarkets because the user does not want to wait in a check-out line in a supermarket. In this example, the user also sets preferences for selecting stores that are closer to the user's current position and/or closer to the route the user is travelling on and that offer lower prices.

In another embodiment, the criteria are set by the platform 103 based upon the navigation context, user context, user preferences, or a combination thereof. The related context information includes preferences, activities, location, time, date, or a combination thereof with respect to the device and/or the user of the device. By way of example, the platform 103 detects that the gasoline tank is running empty, and sets closer gas stations objects with higher priority and therefore with greater visibility. The platform 103 sets restaurant objects with higher priority because it is lunch time, further sets particular fast food chain objects with even higher priority because the user visits the chain stores frequently. In yet another embodiment, the platform 103 displays the set criteria and/or the priority list to the user prior to implementing the prioritization on the map.

The custom zooming platform 103 determines one or more images associated with the one or more of the plurality of relevant objects that are going to be render on the device at the selected zoom level (Step 309). By way of example, the user may decide to show only the coffee shops and the convenience stores and skip the supermarkets. In this case, the platform 103 retrieves the symbol images of a coffee shops and a convenience store for display at the selected zoom level.

The custom zooming platform 103 also determines another input from the user of the device for specifying at least one different level of visibility of the images (e.g., in conjunction with various visual and audio effects) according to size, shape, color, filament type, dimensionality, animation, associated multimedia files, or a combination thereof (Step 311). The visual effects may include 2D, 3D, animated mapping, timeline mapping, holographic, augmented reality, etc. By way of example, the coffee shop symbols are twice lager than convenience store symbols, and they will be flashing with yellow light on the screen at the selected zoom level while the background music is playing the Coffee Song by Frank Sinatra. In another embodiment, the platform 103 generates a Frank-Sinatra-like avatar and the animation of the avatar singing the Coffee Song, and posts the singing avatar at the closest coffee shop on the map at the selected zoom level.

Thereafter, the custom zooming platform 103 determines to render one or more of the plurality of objects with the at least one different level of visibility with respect to other ones of the plurality of objects based, at least in part, on the respective degrees of relevance, the level of zoom, the prioritization, or a combination thereof, for example as respective overlays, in the geographic representation (Step 313). The rendering of the one or more of the plurality of objects with the at least one different level of visibility is performed using a tile rendering engine, a raster rendering engine, a vector rendering engine, or a combination thereof. By way of example, overlays of the images can be easily implemented at the tile system when rendering the selected zoom level.

Figure 4:
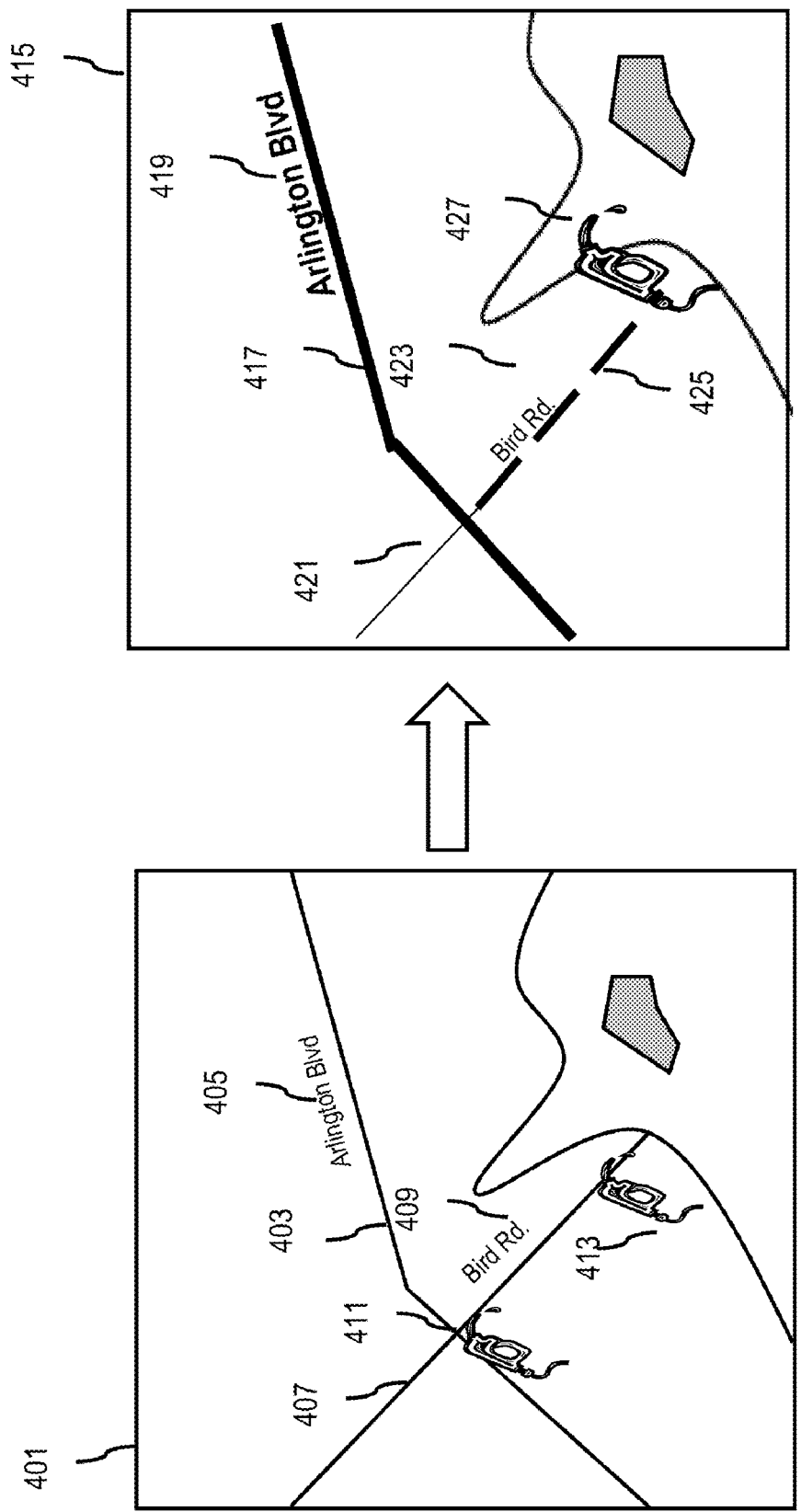
FIG. 4 depicts a map and a custom zoom map, according to one embodiment.

FIG. 4 includes a map 401 and a custom zoom map 415, according to various embodiments. The map 401 on which the custom zooming process is applied to enhance the visibility of the street 407 and a gas station 413 in the map 415 of a different zoom level. In the map 401, the lines representing the streets 403, 407 are of the same width, the name text of the streets 403, 407 are of the same font size, and the markers representing gas stations 411, 413 are of the same size. The custom zooming process manipulates the visibility of the map objects that are more relevant to a particular user context at the next zoom level as shown in the map 415 on the right side of FIG. 4. In the map 415, the street "Arlington Blvd." is on the traveling route (i.e., one user context) so the line 417 representing the street is thicker than the line 421 of the street "Bird Rd.," and the text 419 has a bigger font size than the one of the text 423.

In this example, the user is handicapped such that a gas station offering full service is required (i.e., another user context). Accordingly, the full service gas station 427 is rendered more visibly in the map 415. As shown in the map 415, only the gas station 427 which has full service is shown. In addition, the map object of the gas station 427 is enlarged. In addition, the street line 425 is highlighted as a thicker broken line to indicate a side trip to the gas station of full service, thereby increasing its visibility while still differentiating it from the more relevant Arlington Road object 419 on the traveling route.

Figure 5:
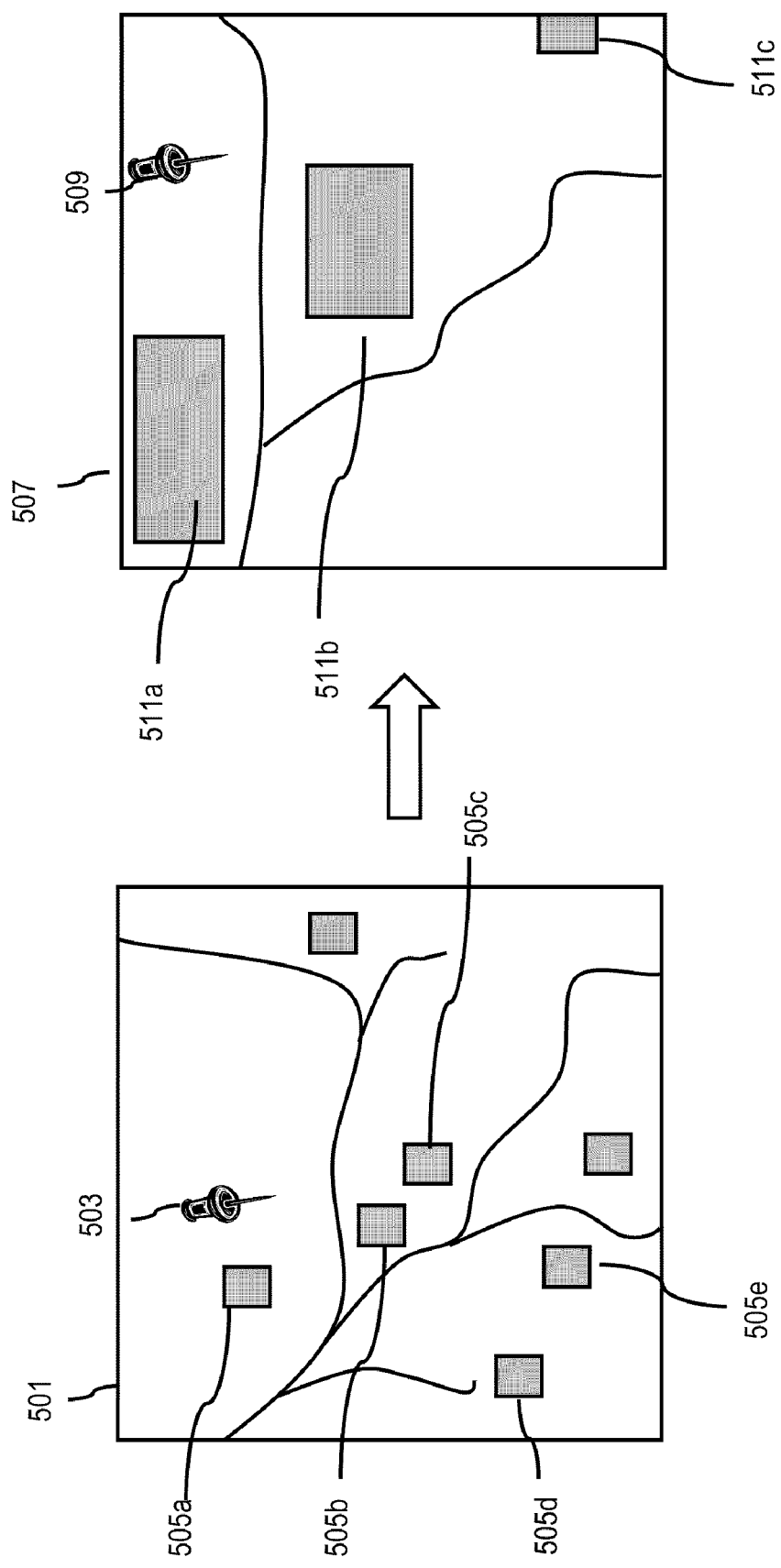
FIG. 5 depicts a map and a custom zoom map, according to one embodiment.

FIG. 5 depicts a map 501 and a custom zoom map 507, according to various embodiments. In this example, a user is searching for a new apartment and has generated the map 501 to show map objects 505a-505e that represent apartment complexes with current vacancies. The user has also marked a point 503 to indicate the location of the user's office. In addition, the user has specified (e.g., via the system 100) relevance criteria in order of importance as follows: a distance to the office, monthly rents, size, amenities, etc. The user then specifies an input for zooming into the map 501 to generate the custom zoom map 507. The system 100 calculates a relevance level of each apartment unit 511a-511c, and determines the levels of visibility of their respective map objects accordingly for rendering in the map 507. In this example, since the office location 509 is located in an evenly developed suburban area, the rents are very close. Therefore, the distances form the apartments to the office become the predominant factor in custom zooming. In the map 507, the closer an apartment unit is to the office, the bigger its label. In this example, the label is a box representing the apartment complex.

It is contemplated that the above-described embodiments can be used with numerous geographic representation to display quantitative and qualitative information, such as urban maps for navigational or real estate use (wherein objects include buildings, parking lots, etc.), nature park maps (where objects include fountains, caves, feeding ground, etc.), resource maps (where objects include corn fields, wheat fields, oil fields, gas fields, etc.), exhibition area maps (where objects include exhibit booths, etc.), amusement park maps (where objects include theme rides, restaurants, restrooms, information desks, etc.), etc.

The custom zoom maps can contain as many objects (e.g., POIs) as can be rendered on a display while maintaining legibility. The custom zoom map makes it easier for the user to locate contextually relevant information at a glance. In addition to availability on the UE 101, the custom zoom map may be available online or onboard in, for instance, navigation-enabled vehicles. The custom zoom map may also be adapted for express delivery services, emergency and government routing plans, efficient field service management, numerous fleet operations, mobile commerce, and any location based services (LBS). The described embodiments provide custom zoom maps rendered according to contextual information relevant to particular individuals.

The processes described herein for custom zooming of geographic representation may be advantageously implemented via software, hardware, firmware or a combination of software and/or firmware and/or hardware. For example, the processes described herein, including for providing user interface navigation information associated with the availability of services, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 6:
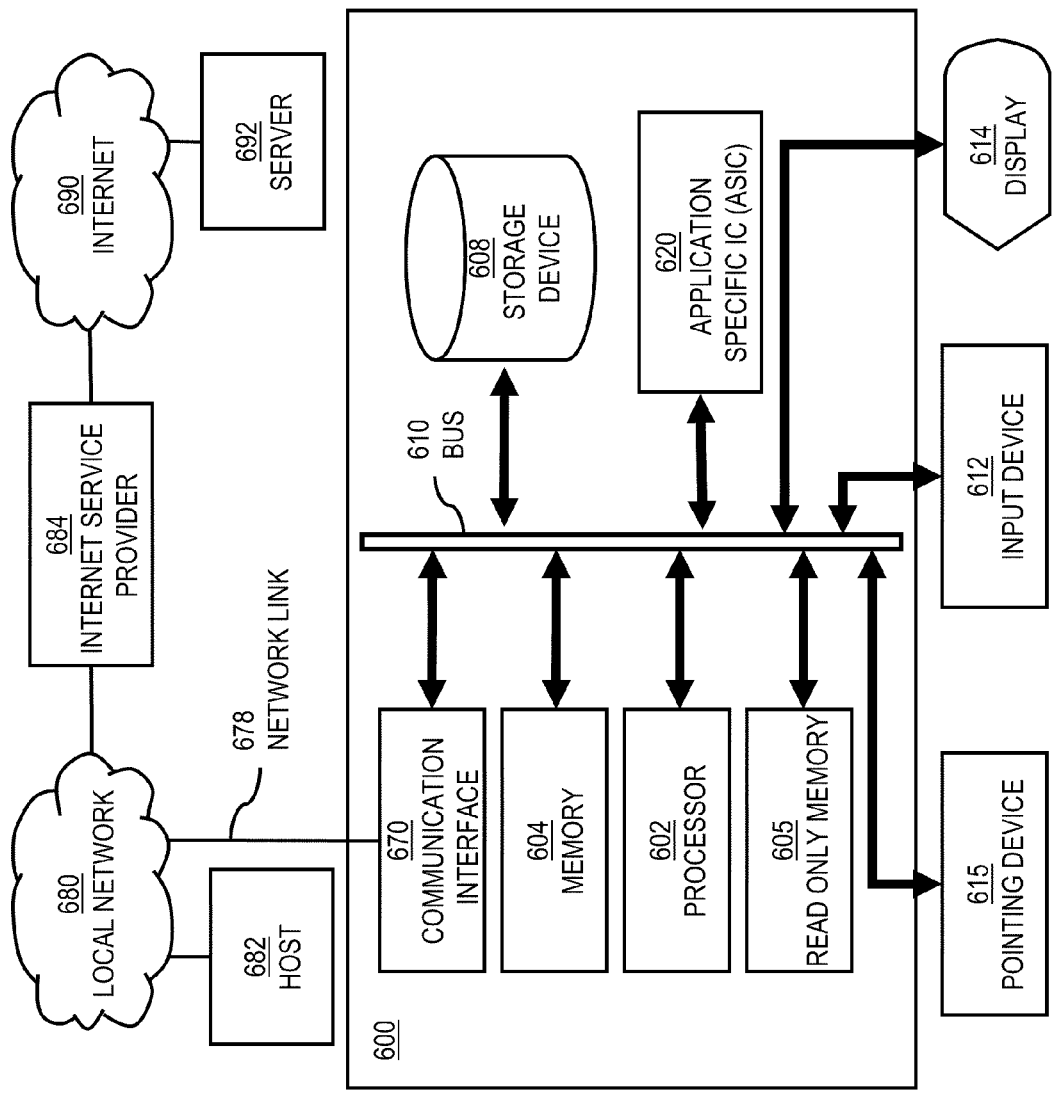
FIG. 6 is a diagram of hardware that can be used to implement an embodiment of the invention.

FIG. 6 illustrates a computer system 600 upon which an embodiment of the invention may be implemented. Although computer system 600 is depicted with respect to a particular device or equipment, it is contemplated that other devices or equipment (e.g., network elements, servers, etc.) within FIG. 6 can deploy the illustrated hardware and components of system 600. Computer system 600 is programmed (e.g., via computer program code or instructions) to custom zoom in/out of geographic representation as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of custom zooming of geographic representation.

A bus 610 includes one or more parallel conductors of information so that information is transferred quickly among devices coupled to the bus 610. One or more processors 602 for processing information are coupled with the bus 610.

A processor (or multiple processors) 602 performs a set of operations on information as specified by computer program code related to custom zoom in/out of geographic representation. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or other dynamic storage device, stores information including processor instructions for custom zooming of geographic representation. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for custom zooming of geographic representation, is provided to the bus 610 for use by the processor from an external input device 612, such as a keyboard containing alphanumeric keys operated by a human user, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT) or a liquid crystal display (LCD), or plasma screen or printer for presenting text or images, and a pointing device 616, such as a mouse or a trackball or cursor direction keys, or motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of application specific ICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the UE 101 via the communication network 107 for custom zooming of geographic representation.

The term "computer-readable medium" as used herein refers to any medium that participates in providing information to processor 602, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 608. Volatile media include, for example, dynamic memory 604. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system 600 can be deployed in various configurations within other computer systems, e.g., host 682 and server 692.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

Figure 7:
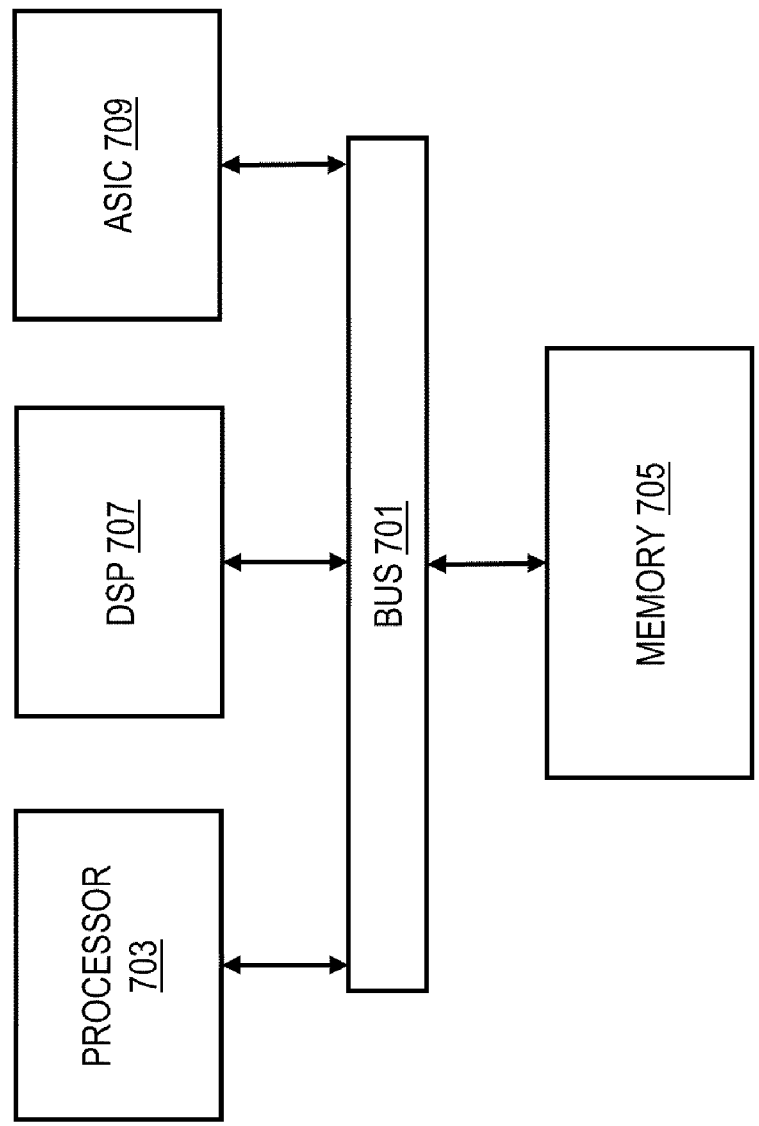
FIG. 7 is a diagram of a chip set that can be used to implement an embodiment of the invention.

FIG. 7 illustrates a chip set or chip 700 upon which an embodiment of the invention may be implemented. Chip set 700 is programmed to custom zoom in/out of geographic representation as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of providing user interface navigation information associated with the availability of services. Chip set or chip 700, or a portion thereof, constitutes a means for performing one or more steps of custom zooming of geographic representation.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to custom zoom in/out of geographic representation. The memory 705 also stores the data associated with or generated by the execution of the inventive steps.

Figure 8:
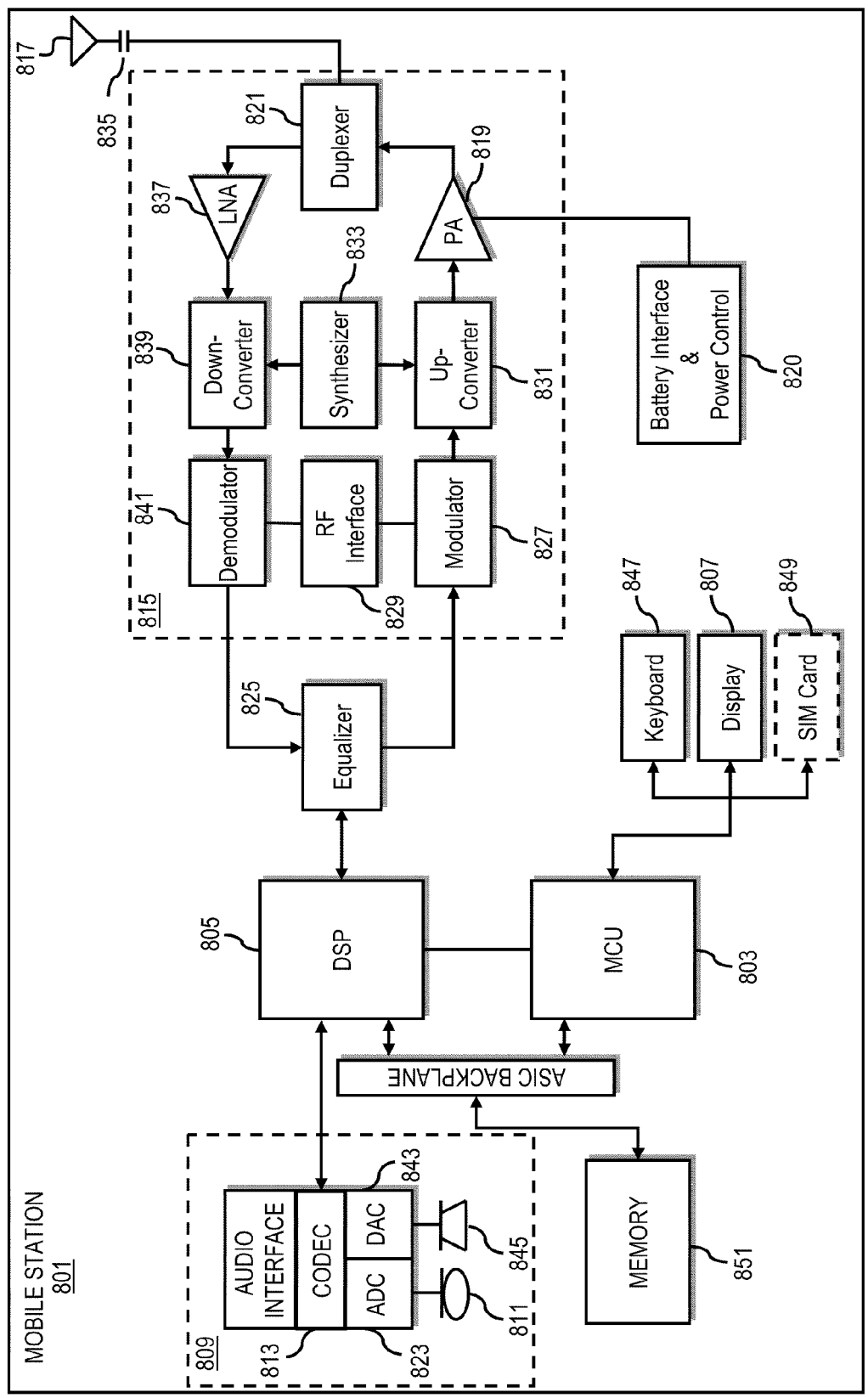
FIG. 8 is a diagram of a mobile terminal (e.g., handset) that can be used to implement an embodiment of the invention.

FIG. 8 is a diagram of exemplary components of a mobile terminal (e.g., handset) for communications, which is capable of operating in the system of FIG. 1, according to one embodiment. In some embodiments, mobile terminal 801, or a portion thereof, constitutes a means for performing one or more steps of custom zooming of geographic representation. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile terminal functions that perform or support the steps of custom zooming of geographic representation. The display 807 includes display circuitry configured to display at least a portion of a user interface of the mobile terminal (e.g., mobile telephone). Additionally, the display 807 and display circuitry are configured to facilitate user control of at least some functions of the mobile terminal. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803—which can be implemented as a Central Processing Unit (CPU) (not shown).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile terminal 801 to custom zoom in/out of geographic representation. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the terminal. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile terminal 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile terminal 801 on a radio network. The card 849 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating access to at least one interface to allow access to at least one service, the service configured to at least perform the following:
   determining, by at least one processor, an input specifying a level of zoom for rendering a geographic representation presented at a device, the geographic representation including a plurality of objects;
   determining, by the at least one processor, respective degrees of relevance of the plurality of objects based, at least in part, on the device, a user of the device, related context information, or a combination thereof; and
   determining to render one or more of the plurality of objects with at least one different level of visibility with respect to other ones of the plurality of objects based, at least in part, on the respective degrees of relevance, the level of zoom, or a combination thereof.

2. A method of claim 1, wherein the service is further configured to perform:
   determining to prioritize the plurality of objects based, at least in part, on one or more criteria;
   wherein the rendering of the one or more of the plurality of objects with the at least one different level of visibility is based, at least in part, on the prioritization.

3. A method of claim 1, wherein the service is further configured to perform:
   determining another input from a user of the device for specifying the at least one different level of visibility.

4. A method of claim 1, wherein the service is further configured to perform:
   determining one or more images associated with the one or more of the plurality of objects; and
   determining to render the one or more images as respective overlays in the geographic representation.

5. A method of claim 1, wherein the service is further configured to perform:
   determining route information, mapping information, navigation information, or a combination thereof associated with the device or a user of the device,
   wherein the determining of the respective degrees of relevance is based, at least in part, on the route information, the mapping information, the navigation information, or a combination thereof.

6. A method of claim 1, wherein the respective degrees of relevance are determined based, at least in part, on metadata of the geographic representation, metadata of the plurality of objects, semantic information of the geographic representation, semantic information of the plurality of objects, or a combination thereof.

7. A method of claim 1, wherein the at least one different level of visibility adjusts rendering of the plurality of objects according to size, shape, color, filament type, dimensionality, animation, associated multimedia files, or a combination thereof.

8. A method of claim 1, wherein the plurality of objects are represented in the geographic representation as text, symbols, signs, markers, tabs, avatars, or a combination thereof.

9. A method of claim 1, wherein the related context information include preferences, activities, location, time, date, or a combination thereof with respect to the device, the user of the device, or a combination thereof.

10. A method of claim 1, wherein the rendering of the one or more of the plurality of objects with the at least one different level of visibility is performed using a tile rendering engine, a raster rendering engine, a vector rendering engine or a combination thereof.

11. An apparatus comprising:
    at least one processor; and
    at least one memory including computer program code for one or more programs,
    the at least one memory and the computer program code configured to, with the at least one processor, cause the apparatus to perform at least the following,
      determine an input specifying a level of zoom for rendering a geographic representation presented at a device, the geographic representation including a plurality of objects;
      determine respective degrees of relevance of the plurality of objects based, at least in part, on the device, a user of the device, related context information, or a combination thereof; and
      determine to render one or more of the plurality of objects with at least one different level of visibility with respect to other ones of the plurality of objects based, at least in part, on the respective degrees of relevance, the level of zoom, or a combination thereof.

12. An apparatus of claim 11, wherein the apparatus is further caused to:
  determine to prioritize the plurality of objects based, at least in part, on one or more criteria;
  wherein the rendering of the one or more of the plurality of objects with the at least one different level of visibility is based, at least in part, on the prioritization.

13. An apparatus of claim 11, wherein the apparatus is further caused to:
  determine another input from a user of the device for specifying the at least one different level of visibility.

14. An apparatus of claim 11, wherein the apparatus is further caused to:
  determine one or more images associated with the one or more of the plurality of objects; and
  determine to render the one or more images as respective overlays in the geographic representation.

15. An apparatus of claim 11, wherein the apparatus is further caused to:
  determine route information, mapping information, navigation information, or a combination thereof associated with the device or a user of the device,
  wherein the determining of the respective degrees of relevance is based, at least in part, on the route information, the mapping information, the navigation information, or a combination thereof.

16. An apparatus of claim 11, wherein the respective degrees of relevance are determined based, at least in part, on metadata of the geographic representation, metadata of the plurality of objects, semantic information of the geographic representation, semantic information of the plurality of objects, or a combination thereof.

17. An apparatus of claim 11, wherein the at least one different level of visibility adjusts rendering of the plurality of objects according to size, shape, color, filament type, dimensionality, animation, associated multimedia files, or a combination thereof.

18. A non-transitory computer-readable storage medium carrying one or more sequences of one or more instructions which, when executed by one or more processors, cause an apparatus to at least perform the following steps:
  determining an input specifying a level of zoom for rendering a geographic representation presented at a device, the geographic representation including a plurality of objects;
  determining respective degrees of relevance of the plurality of objects based, at least in part, on the device, a user of the device, related context information, or a combination thereof; and
  determining to render one or more of the plurality of objects with at least one different level of visibility with respect to other ones of the plurality of objects based, at least in part, on the respective degrees of relevance, the level of zoom, or a combination thereof.

19. A non-transitory computer-readable storage medium of claim 18, wherein the apparatus is caused to further perform:
  determining to prioritize the plurality of objects based, at least in part, on one or more criteria;
  wherein the rendering of the one or more of the plurality of objects with the at least one different level of visibility is based, at least in part, on the prioritization.

20. A non-transitory computer-readable storage medium of claim 18, wherein the apparatus is caused to further perform:
  determining another input from a user of the device for specifying the at least one different level of visibility.

* * * * *